United States Patent [19]

Ohtani et al.

[11] Patent Number: 5,278,251

[45] Date of Patent: * Jan. 11, 1994

[54] INJECTION COMPACTING COMPOSITION FOR PREPARING SINTERED BODIES

[75] Inventors: Takamitsu Ohtani; Kazuyuki Hagino, both of Kyoto; Hiromitsu Kinoshita, Mishima; Akira Taniuchi; Norimasa Uesugi, both of Kyoto, all of Japan

[73] Assignees: Dai-ichi Ceramo Co., Limited, Kanzaki; Dai-ichi Kogyo Seiyaku Co., Ltd., Kyoto, both of Japan

[*] Notice: The portion of the term of this patent subsequent to Jan. 26, 2010 has been disclaimed.

[21] Appl. No.: 693,467

[22] Filed: Apr. 30, 1991

Related U.S. Application Data

[63] Continuation-in-part of Ser. No. 677,928, Apr. 1, 1991.

[51] Int. Cl.$^5$ .............................. C08F 265/04
[52] U.S. Cl. .................... 525/309; 525/67; 525/69; 525/70; 524/504; 252/302
[58] Field of Search ............... 525/309, 67, 69, 70; 524/504, 564; 252/302

[56] References Cited

U.S. PATENT DOCUMENTS 4,492,783  1/1985  Tanaka et al. ................ 524/430

FOREIGN PATENT DOCUMENTS

0352714  1/1990  European Pat. Off. .
51-71595X  8/1976  Japan .
60-223810  11/1985  Japan .
62-281816  1/1987  Japan .
91-010991  11/1990  Japan .
91-039577  12/1990  Japan .
3-233265  6/1991  Japan .
1193285  5/1970  United Kingdom .

Primary Examiner—John Kight, III
Assistant Examiner—Duc Truong
Attorney, Agent, or Firm—Varndell Legal Group

[57] ABSTRACT

An injection compacting composition having excellent injection compacting characteristics such as powder flowability and an excellent binder removability and being capable of providing compacts having a high strength and sintered compacts having no defects such as warpage and cracks in high yields, which comprises (1) an inorganic powder and (2) an organic binder comprising a composite acrylic polymer and a wax having a melting point of at most 100° C. and being compatible with said composite acrylic polymer, said composite acrylic polymer being a suspension polymerization product prepared by dissolving (a) a polymer selected from the group consisting of an ethylene-vinyl acetate copolymer and an ethylene-ethyl acrylate copolymer in (b) an acrylic or methacrylic acid ester monomer or a mixture of an acrylic or methacrylic acid ester monomer and a styrene compound monomer, dispersing the resulting solution in an aqueous medium in the presence of a dispersing agent, and subjecting the resulting dispersion to a suspension polymerization.

8 Claims, 4 Drawing Sheets

INJECTION COMPACTING COMPOSITION FOR PREPARING SINTERED BODIES

CROSS-REFERENCE TO RELATED APPLICATION

This is a continuation-in-part of application Ser. No. 07/677,928 filed on Apr. 1, 1991.pending

BACKGROUND OF THE INVENTION

The present invention relates to an injection compacting composition for preparing sintered bodies which comprises an inorganic powder and a specific organic binder. More particularly, the present invention relates to the injection compacting composition which has a good injection compactibility and a good binder removability from green compacts in the sintering step and which can provide sintered bodies having no or little defects such as warpage and cracks and a good dimensional stability in high yields, and also relates to sintered bodies prepared therefrom.

Sintered bodies have been prepared by compacting a mixture of an inorganic powder with an organic binder and sintering the resulting compact. In recent years, ceramic products prepared by mixing a ceramic powder and an organic binder, imparting a plasticity to the mixture, injection-compacting the mixture to give a green compact, removing the binder from the compact and sintering the compact, are being gradually used as engine parts for automobiles. The ceramic products have features that parts of complicated shape can be mass-produced industrially.

The organic binders have connection with uniform dispersibility of ceramic powders, flowability of the powders mixed therewith, strength of green compacts and easiness in removal of the binders from green compacts (binder removability). Accordingly, if the selection and the amount of use of the binders are not appropriate, no good sintered bodies are obtained. For example, if a ceramic powder is not sufficiently uniformly dispersed in an organic binder, defects such as warpage and cracks are easy to be produced in the produced compacts or sintered bodies, and the strength of the compacts is also decreased. Also, if the organic binders are poor in thermal stability, they are deteriorated in the cylinder of an injection molding machine and the flowability of compacting compositions is not stabilized, thus no good injected compacts are obtained or at times the ceramic powder may be separated from the organic binder. If the organic binder is used in excess, it is difficult to avoid blistering and cracking due to a large guantity of a gas generated from the inside of compacts in the step of removing the binder.

As the organic binder used in compacting ceramic powders, there have been used, for instance, waxes and polymers such as ethylene-vinyl acetate copolymer (EVA), ethylene-ethyl acrylate copolymer (EEA), polystyrene, atactic polypropylene (APP), polyethylene and acrylic and methacrylic polymers. The organic binders used in the preparation of sintered bodies are required to have good characteristics such as compactibility (e.g. compacting stability, mold releasing property and powder flowability in compacting inorganic powders to which the binders are added), strength of green compacts, removability of binder from green compacts by thermal decomposition prior to the sintering, shape retainability in sintering and amount of residual carbon. However, known binders have both merits and demerits and are not always satisfactory in these characteristics.

In general, the polymer binders are superior in compactibility, but have the drawback of being poor in removability. For instance, ethylene-vinyl acetate copolymer (EVA) is superior in powder flowability and can provide green compacts having a high strength and an adequate elasticity without impairing the flowability when mixed with a ceramic powder, but defects such as blister and cracks are easy to occur due to acetic acid gas which starts to generate at near 200° C. in removing the binder from compacts by thermal decomposition.

Similarly to EVA, the ethylene-ethyl acrylate copolymer (EEA) can also provide a high strength and an adequate elasticity to compacts without impairing the flowability when mixed with ceramic powders or metallic powders. However, if it is used in a large quantity, blisters and cracks are markedly produced in the compacts when removing the binder by thermal decomposition. Thus it is difficult to remove the binder without impairing the compacts.

Also, polystyrene, and acrylic and methacrylic polymers (e.g. polyisobutyl methacrylate) have an excellent binding effect on ceramic powders and metallic powders and impart a high strength to green compacts. In particular, they are effective for preventing damages of thin portions, thus imparting an excellent shape retainability to green compacts. They are also superior in thermal decomposability and are easy to be removed from the compacts. However, when they are used in a large quantity, mixtures with ceramic or metallic powders are insufficient in flowability, and are easy to invite poor results in injection molding such as shortage of filling and weld line.

Atactic polypropylene shows a good flowability of mixtures with ceramic powders, and the injection molding is easy and there can be produced green compacts having a strength sufficient for handling (Japanese Patent Publication Kokoku No. 51-29170). However, it has the disadvantage of being inferior in binder removability.

Wax binders such as paraffin are generally superior in removability to polymer binders, but have the drawbacks that they are poor in injection compactibility because the flowability is unstable under a high pressure, and that the strength of obtained green compacts is low because they are compounds with relatively low molecular weight.

In order to obtain a binder having satisfactory properties, it has been required to use a mixed binder by combining two or more of binders having different characteristics in a good balance. However, a difficulty is encountered in obtaining a homogeneous mixture by mixing such known binders, or a long time is required for the mixing, because they differ from each other in form and softening point and also because the solubility or compatibility is not satisfactory. In general, if the mixing of two or more binders is not so sufficient as to provide a homogeneous mixture, it takes a longer time to determine the compacting conditions since the flowability of the mixture is not stabilized. Also, since the uniformity of obtained compacts is impaired, the use of nonuniform binder mixture may cause cracking of sintered bodies in addition to influence on dimensional stability of compacts.

It is an object of the present invnetion to provide an injection molding composition which is suitable for the preparation of sintered bodies of an inorganic powder such as ceramic powder or metallic powder by injection molding, and which has well balanced characteristics such as injection compactibility, strength of green compacts and binder removability by thermal decomposition prior to the sintering, and which can provide in a high yield sintered bodies having no defects such as warpage, cracks and sink marks.

Another object of the present invention is to provide a sintered body of a ceramic powder or a metallic powder having no defects.

These and other objects of the present invention will become apparent from the description hereinafter.

SUMMARY OF THE INVENTION

In accordance with the present invention, there is provided an injection compacting composition suitable for preparing sintered bodies which comprises an inorganic powder and an organic binder comprising 45 to 80% by weight of a composite acrylic polymer and 10 to 50% by weight of a wax having a melting point of at most 100° C. and being compatible with said composite acrylic polymer, the ratio of said inorganic powder to said organic binder being from 0.65/0.35 to 0.25/0.75 by volume, and said composite acrylic polymer being a suspension polymerization product prepared by dissolving (a) a polymer selected from the group consisting of an ethylene-vinyl acetate copolymer and an ethylene-ethyl acrylate copolymer in (b) an acrylic or methacrylic acid ester monomer or a mixture of an acrylic or methacrylic acid ester monomer and a styrene compound monomer, dispersing the resulting solution in an aqueous medium in the presence of a dispersing agent, and subjecting the resulting dispersion to a suspension polymerization.

BRIEF DESCRIPTION OF THE DRAWINGS

FIGS. 1 to 4 are microphotographs of acrylic polymers treated by etching with a solvent so as to reveal the inner structure of the polymer particles, observed by a scanning electron microscope of 5,000 magnifications, wherein FIGS. 1 and 3 show microphotographs of composite acrylic polymers prepared according to the present invention, and FIGS. 2 and 4 show microphotographs of polymer blends prepared by blending two or more polymers.

DETAILED DESCRIPTION

The inorganic powders used with the specific organic binder for preparing the injection compacting composition of the present invention are not particularly limited so long as they are inorganic powders which have been used for the purposes of sintered bodies. In particular, inorganic powders having a spherical particle form or a form near sphere and having an average particle size of about 0.1 to about 50 μm, especially about 0.1 to about 20 μm, are preferred from the viewpoints of the packing density of inorganic powders and the flowability of the compacting composition.

Representative examples of the inorganic powder are, for instance, a metallic powder such as iron, an iron alloy, e.g. iron-nickel alloy, iron-cobalt alloy or stainless steel, tungsten, an aluminum alloy, or a copper alloy; an oxide ceramic powder such as alumina, zirconia, mullite, titanate or ferrite; a nitride ceramic powder such as silicon nitride, aluminum nitride or boron nitride; a carbide ceramic powder such as silicon carbide, aluminum carbide or tungsten carbide; an intermetallic compound such as titanium-aluminum alloy; a phosphate powder such as apatite; and the like.

The inorganic powder may contain 1 to 50% by volume of a fiber or whisker of a metal or an inorganic material other than metals. Examples of the fiber and whisker used in combination with the inorganic powder are, for instance, those of metals such as steel, stainless steel, aluminum, magnesium, nickel, titanium, beryllium, tungsten, molybdenum and boron, and those of inorganic materials other than metals such as alumina, zirconia, silicon carbide, boron carbide, silicon nitride, boron nitride and aluminum nitride.

The organic binder used in the present invention comprises at least two components, namely 45 to 80% by weight of the composite acrylic polymer and 10 to 50% by weight, preferably 15 to 40% by weight of a wax having a melting point of at most 100° C. and a compatibility with the composite acrylic polymer. The above mixed organic binder may also contain 0 to 40% by weight, preferably 0 to 25% by weight, of additives, e.g. a plasticizer such as a phthalic acid ester, a lubricant or mold releasing agent such as a higher fatty acid, a surface active agent for improving the wettability of the surface of inorganic powders, and a surface treating agent (coupling agent).

The composite acrylic polymer, wax and optionally additives may be previously admixed to form the organic binder and be added to the inorganic powder, or they may be individually added to the inorganic powder.

The composite acrylic polymer has an excellent uniform structure as compared with a polymer blend. It is superior in the flowability of the compacting composition and the removability from green compacts, and has an excellent effect of binding inorganic particles. It is used for the purpose of imparting a sufficient flowability to the obtained composition and imparting sufficient strength and elasticity to the green compacts obtained from the composition.

The composite acrylic polymer is prepared by dissolving the polymer component (a), i.e. an ethylenevinyl acetate copolymer and/or an ethylene-ethyl acrylate copolymer, and a polymerization initiator in the monomer component (b), i.e. an acrylic or methacrylic acid ester alone or a mixture of an acrylic or methacrylic acid ester and styrene, dispersing the resulting solution in an aqueous medium containing a dispersing agent, and subjecting the resulting dispersion to a suspension polymerization. A chain transfer agent may be used as occasion demands, and it is added to the above-mentioned solution.

Figure 1:
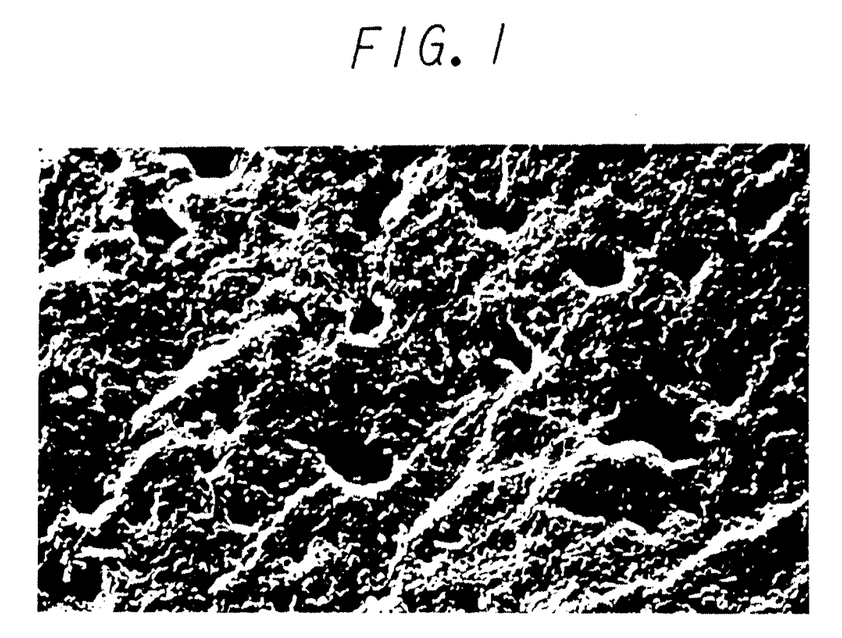
Figure 2:
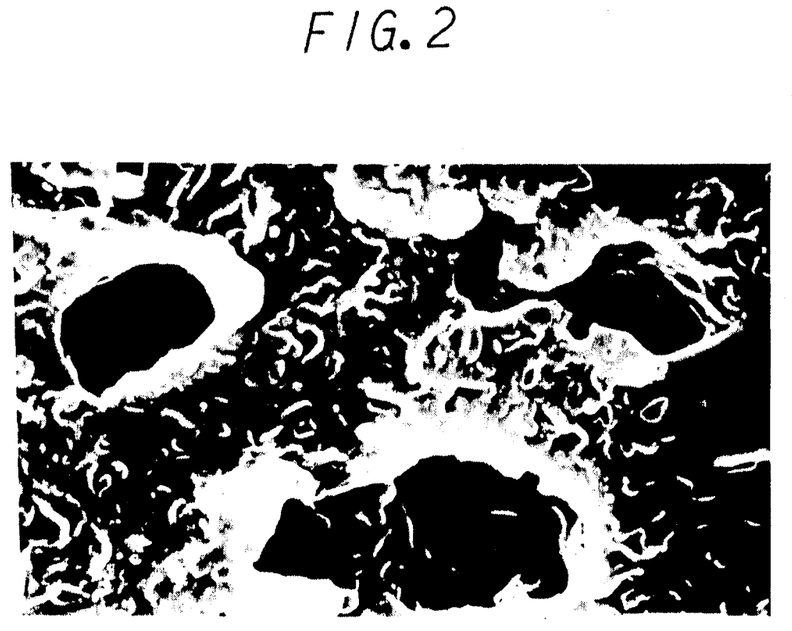
Figure 3:
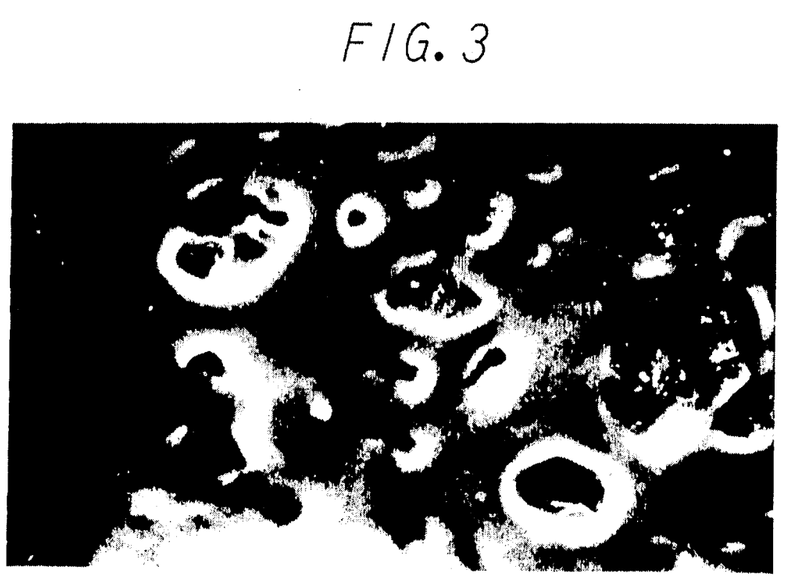

Since the composite acrylic polymer is prepared by previously dissolving EVA and/or EEA in the monomer component and then dispersing the resulting solution in an aqueous medium followed by suspension polymerization, it is in the state like a sort of a polymer alloy wherein the polymer formed from the monomer component (b) is very uniformly dispersed in the polymer component (a), as observed in FIGS. 1 and 3 which are microphotographs of composite acrylic polymer particles prepared according to the present invention and etched with a solvent to reveal the inner structure of the particles. The composite acrylic polymer has the advantages that the conditions for compacting the composition can be determined more easily as compared with the use of a mere blend of the polymers (cf. FIGS. 2 and 4) and the flowability of the composition is stabilized and, therefore, good sintered bodies can be obtained in high yields with a little scatter.

The ethylene-vinyl acetate copolymers (EVA) used in the present invention are not particularly limited, and any of commercially available ethylele-vinyl acetate copolymers can be used. Copolymers of ethylene and vinyl acetate in a ratio of 85/15 to 50/50 by weight, especially 80/20 to 60/40 by weight, are particularly preferred, since if the ratio is more than 85/15 by weight, it becomes hard to dissolve in the monomer component (b), and since if the ratio is less than 50/50 by weight, such copolymers are available with difficulty and also there is a tendency to lower the strength of green compacts. From the viewpoint of the viscosity of the solution of the copolymers dissolved in the monomer component (b), it is preferable that the ethylene-vinyl acetate copolymers are those having a melt index of about 10 to about 500. From the viewpoints of the powder flowability required in compacting and the strength of green compacts, it is more preferable that the copolymers are those having a melt index of about 20 to about 400.

The ethylene-ethyl acrylate copolymers (EEA) used in the present invention are not particularly limited, and any of commercially available ethylene-ethyl acrylate copolymers can be used. Copolymers of ethylene and ethyl acrylate in a ratio of 85/15 to 50/50 by weight, especially 80/20 to 60/40 by weight, are preferred, since if the ratio is more than 85/15 by weight, it becomes hard to dissolve in the monomer component (b), and since if the ratio is less than 50/50 by weight such copolymers are available with difficulty and also there is a tendency to lower the strength of green compacts. From the viewpoint of the viscosity of the solution of the copolymers dissolved in the monomer component (b), it is preferable that the ethylene-ethyl acrylate copolymers are those having a melt index of about 10 to about 2,000. From the viewpoints of the powder flowability and the strength of green compacts, it is more preferable that the copolymers are those having a melt index of about 100 to about 1,500.

The acrylic and methacrylic acid esters used as the monomer component (b) are not particularly limited, but from the viewpoints of powder flowability in compacting, strength of green compacts and binder removability, esters of acrylic or methacrylic acid with an alcohol having 1 to 8 carbon atoms are preferred. Examples of the (meth)acrylic acid ester are, for instance, n-alkyl (meth)acrylates having a $C_1$ to $C_8$ alkyl group, isopropyl (meth)acrylate, isobutyl (meth)acrylate, t-butyl (meth)acrylate, 2-ethylhexyl (meth)-acrylate, 2-methoxyethyl (meth)acrylate, 2-ethoxyethyl (meth)acrylate, and the like. Among them, n-alkyl (meth)acrylates having a $C_1$ to $C_4$ alkyl group, isopropyl (meth)acrylate and isobutyl (meth)acrylate are particularly preferred. The (meth)acrylic acid esters may be used alone or in admixture thereof.

The (meth)acrylic acid esters can be used in admixture with a styrene compound. Representative examples of the styrene compound are, for instance, styrene, α-methylstyrene, p-methylstyrene and vinyl styrene. Preferably, the content of the styrene compound in a mixture of the (meth)acrylic acid ester and the styrene compound is not more than 80% by weight. The flowability of the obtained binder decreases with increasing the amount of styrene compound, thus the use of the styrene compound in a higher proportion tends to lower the compactibility.

Other monomers, e.g. acrylic acid, methacrylic acid, vinyl acetate and vinyl chloride, may be used in a small amount as the component (b) so long as the desired properties of the obtained polymer used as the binder are not substantially impaired.

The polymer component (a) and the monomer component (b) are used in an (a)/(b) ratio of about 5/95 to about 80/20 by weight, preferably about 20/80 to about 70/30 by weight. When the (a)/(b) ratio is less than 5/95 by weight, the powder flowability in compacting is apt to be insufficient. Insufficient flowability is easy to cause bad compacting. When the (a)/(b) ratio is more than 80/20 by weight, blistering may occur when the binder is removed by thermal decomposition, thus resulting in lowering of the strength of sintered body, and also the binder removal and the handling become difficult.

It is preferable to use an oil-soluble polymerization initiator so that the polymerization proceeds in oil droplets dispersed in the aqueous medium, thus polymer particles wherein the polymer component (a) and the polymer formed from the monomer component (b) are uniformly blended, are produced. Representative examples of the polymerization initiator are, for instance, an organic peroxide such as benzoyl peroxide, lauroyl peroxide or t-butyl-peroxy-2-ethylhexanate, an azo compound such as azoisobutylonitrile or azobisdimethylvaleronitrile, and other oil-soluble polymerization initiators. The initiators may be used alone or in admixture thereof. The amount of the initiator is from 0.05 to 1.5 parts by weight, preferably 0.1 to 0.6 part by weight, per 100 parts by weight of the monomer component (b).

Representative examples of the chain transfer agent which may be used in the polymerization in order to control the molecular weight are, for instance, a mercaptan such as dodecylmercaptan or t-octylmercaptan, α-methylstyrene, and a dimer of α-methylstyrene. The chain transfer agents may be used alone or in admixture thereof. The amount of the chain transfer agent is from 0.01 to 1.0 part by weight, preferably 0.03 to 0.5 part by weight, per 100 parts by weight of the monomer component (b).

It is desirable that the polymer component (a) is completely dissolved in the monomer component (b) so that the reaction proceeds uniformly, thus producing a polymer having a uniform composition. The manner of the dissolution is not particularly restricted. When a polymerization initiator is dissolved, the dissolution should be conducted at a temperature lower than the decomposition temperature of the initiator. The solution is dispersed in an aqueous medium in the presence of a dispersing agent, and the resulting suspension is subjected to a suspension polymerization.

Known dispersing agents can be used in the present invention. Representative examples of the dispersing agent are, for instance, a water-soluble organic high molecular weight compound such as polyvinyl alcohol, hydroxyethyl cellulose or polyvinylpyrrolidone, and a combination of an anionic surface active agent and a fine powder of a slightly water-soluble inorganic compound such as hydroxyapatite or magnesium pyrophosphate. The dispersing agent is used in an amount of 0.1 to 1 part by weight, preferably 0.2 to 0.5 part by weight, per 100 parts by weight of the aqueous medium.

The solution of the polymer component (a) and the initiator in the monomer component (b), which may further contain a chain transfer agent, is dispersed in an aqueous medium, e.g. water, in an amount of 30 to 120 parts by weight, preferably 50 to 100 parts by weight, per 100 parts by weight of the aqueous medium.

The conditions and the like for the suspension polymerization are not particularly limited, thus the suspension polymerization can be conducted in a usual manner. The polymerization temperature is determined according to the decomposition temperature of the polymerization initiator used. The polymerization is usually carried out at a temperature of 50° to 130° C. for 2 to 10 hours.

The thus obtained product of the suspension polymerization is a composite polymer wherein the polymer formed from the monomer component (b) is uniformly dispersed in the polymer component (a), as observed in FIGS. 1 and 3 which are microphotographs of polymer particles prepared according to the present invention and etched with a solvent to reveal the inner structure of the particles.

The composite polymer prepared according to the present invention is useful as a binder for the preparation of sintered bodies of inorganic powders such as metallic powder or ceramic powder, and has the advantages as mentioned above. In the present invention, the composite acrylic polymer is used in combination with a wax. The wax has the effect of making it easy to knead the inorganic powder and the composite acrylic polymer, thereby uniformly dispersing the inorganic powder into the composite polymer, the effect of imparting a plasticity to the obtained compacting composition, and the effect of increasing the flowability of the obtained compacting composition. Also, the amount of the organic binder to be used can be decreased by the combination use of the composite acrylic polymer and the wax as compared with a single use of them.

Waxes having a melting point of at most 100° C. and having a compatibility with the composite acrylic polymer are used in the present invention. When the melting point of the waxes is higher than 100° C., the melting point of the organic binder, namely a combination of the composite acrylic polymer and the wax, is high and the flowability becomes insufficient ad, therefore, it is difficult to decrease the amount of the organic binder to be used. On the other hand, liquid waxes having a melting point below ordinary temperature and solid waxes which are not compatible with the composite acrylic resin do not produce the desired effects as mentioned above, because the former is apt to produce bad results in compacting with respect to strength of compacts and mold releasability, and because the latter makes it difficult to disperse the inorganic powder into the organic binder.

The proportion of the wax in the organic binder used in the present invention is from 10 to 50% by weight, preferably from 15 to 40% by weight, based on the weight of the organic binder. When the amount of the wax is less than 10% by weight, the desired effects mentioned above are not sufficiently exhibited. When the amount is more than 50% by weight, the fatal defect of the wax, namely lack of the strength, markedly appears and, therefore, green compacts are cracked or broken when released from a mold and green compacts having a strength durable to usual handling operation are not substantially obtained.

Both the natural waxes and the synthetic waxes can be used in the present invention. Examples of the wax are, for instance, paraffin waxes, microcrystalline wax, polyethylene wax, bees wax, carnauba wax, montan wax, and the like.

The injection compacting composition of the present invention contains the inorganic powder and the organic binder which contains the composite acrylic polymer and the wax as the essential components, in a powder/binder ratio of 0.65/0.35 to 0.25/0.75 by volume. The volume ratio as used herein is represented by the following equation:

$$\text{Volume ratio} = \frac{\frac{Wp}{Dp}}{\frac{Wp}{Dp} + \frac{Wb}{Db}} / \frac{\frac{Wb}{Db}}{\frac{Wp}{Dp} + \frac{Wb}{Db}}$$

wherein Wp is weight of the inorganic powder, Dp is true specific gravity of the inorganic powder, Wb is weight of the organic binder, and Db is true specific gravity of the organic binder.

When the volume ratio is more than 0.65/0.35, the compacting composition lacks in flowability and is hard to be compacted into a desired shape. When the volume ratio is lower than 0.25/0.75, the density of the obtained compacts is low and, therefore, the sintered compacts are poor in dimensional accuracy due to large shrinkage in sintering and also defects such as cracks and blister are markedly produced in the compacts due to generation of a large quantity of a gas in removal of the binder by thermal decomposition.

The preparation of sintered bodies of ceramics or metals from the injection compacting composition of the present invention is conducted usually according to the following method, but is not limited thereto. Firstly, an inorganic powder such as a ceramic powder or a metallic powder is kneaded sufficiently with the organic binder under heating by a kneader such as a pressure kneader to disperse uniformly the inorganic powder into the organic binder. The resulting mixture is formed into an appropriate shape such as pellets or pulverized coarse particles to provide an injection compacting material. The material is then injectioncompacted into a desired shape using a known injection molding machine as used for usual plastic molding by a known method. The organic binder is then removed from the obtained compacts by thermal decomposition or other methods, and the sintering is carried out in an appropriate atmosphere at an appropriate temperature to give inorganic sintered bodies having a desired shape.

The present invention is more specifically described and explained by means of the following Examples in which all % and parts are by weight unless otherwise noted. It is to be understood that the present invention is not limited to the Examples.

REFERENCE EXAMPLE 1

Preparation of Composite Acrylic Polymer

A 5 liter reactor was charged with 700 g of n-butyl methacrylate (BMA), 500 g of styrene and 0.35 g of n-dodecylmercaptan. To the reactor was added 300 g of an ethylene-vinyl acetate copolymer (EVA) (commercially available under the trade mark "Ultracen" 722 made by Tosoh Corporation) with stirring. The temperature was elevated to 75° C. and the EVA was dissolved in the monomer mixture, and 4.8 g of benzoyl peroxide and 0.25 g of t-butylperoxybenzoate were further dissolved therein. To the reactor was added an aqueous solution of a dispersing agent prepared from 1,840 ml of deionized water and 160 ml of a 3% aqueous solution of polyvinyl alcohol and heated at 80° C., and the content was stirred to form an aqueous suspension. After replacing the polymerization system with nitrogen gas, the polymerization was carried out at 80° C., for 5 hours and then at 110° C. for 2 hours. After cooling the reaction mixture, the produced polymer was taken out of the reactor, washed with water and dried to give white spherical particles, the particle size of which fell within the range of 0.3 to 1.0 mm. The produced polymer had an intrinsic viscosity [n]of 0.70 (toluene solution at 30° C.). The thus obtained polymer is hereinafter referred to as "composite acrylic polymer (A)".

REFERENCE EXAMPLE 2

Preparation of Composite Acrylic Polymer

A 5 liter reactor was charged with 600 g of n-butyl methacrylate (BMA) and 0.3 g of n-dodecylmercaptan, and the temperature was elevated to 75° C. with stirring. To the reactor were added 900 g of an ethylene-vinyl acetate copolymer (EVA) (commercially available under the trade mark "Ultracen" 722 made by Tosoh Corporation) and 2.4 g of benzoyl peroxide as a polymerization initiator, and they were dissolved in BMA to form an EVA-BMA solution. An aqueous solution of a dispersing agent prepared from 1,840 ml of deionized water and 160 ml of 3% aqueous solution of polyvinyl alcohol was added to the reactor and stirred to suspend the EVA-BMA solution in the aqueous solution. After replacing the polymerization system with nitrogen gas, the polymerization was carried out at 80° C. for 3 hours and then at 100° C. for 2 hours. After cooling the reaction mixture, the produced polymer was taken out of the reactor, washed with water and dried.

The produced polymer was in the form of spherical particles, the particle size of which fell within the range of 0.3 to 1 mm, and had an intrinsic viscosity [n]of 0.85 (toluene solution at 30° C.). The thus obtained polymer is hereinafter referred to as "composite acrylic polymer (B)".

REFERENCE EXAMPLES 3 and 4

Preparation of Mixed Acrylic Polymers

The same EVA as used in Reference Example 1, polybutyl methacrylate having a molecular weight of 300,000 and polystyrene were blended by means of mixing rolls at 150° C. for 30 minutes to give a mixed acrylic polymer (A) having approximately the same composition and intrinsic viscosity as those of the composite polymer (A).

Further, the same EVA as used in Reference Example 2 and polybutyl methacrylate having a molecular weight of 300,000 were blended by means of mixing rolls at 140° C. for 30 minutes to give a mixed acrylic polymer (B) having approximately the same composition and intrinsic viscosity as those of the composite polymer (B).

Figure 4:
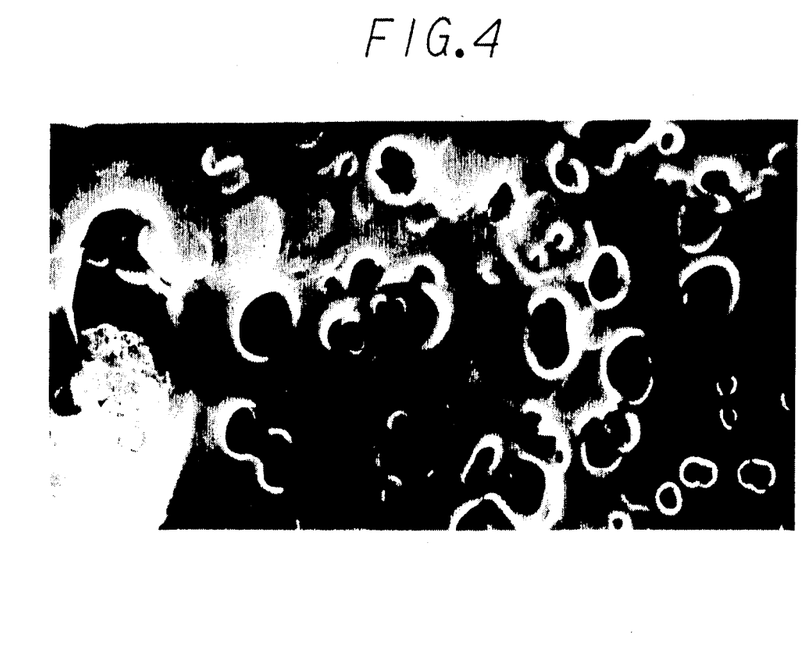

The suspension polymerization products obtained in Reference Examples 1 and 2 and the blends obtained in Reference Examples 3 and 4 were immersed in hexane for 2 minutes for solvent etching treatment in order to observe the inner structure thereof. The etched products and blends were observed by a scanning electron microscope at a magnification of X5,000. The microphotographs thereof are shown in FIGS. 1 to 4 wherein FIG. 1 is for the composite polymer (A) of Reference Example 1, FIG. 2 is for the mixed polymer A of Reference Example 3, FIG. 3 is for the composite polymer (B) of Reference Example 2 and FIG. 4 is for the mixed polymer (B) of Reference Example 2.

In FIGS. 1 and 2, it is observed that in the EVA-BMA-styrene suspension polymerization product of Reference Example 1 fine particles are uniformly dispersed in each other, and there is a marked difference in the state of dispersion between the product of Reference Example 1 and the blend of Reference Example 3. In FIGS. 3 and 4, a similar difference is also observed between the EVA-BMA suspension polymerization product of Reference Example 2 and the blend of Reference Example 4.

EXAMPLE 1

To 100 parts of an alumina powder (commercially available under the trade mark "Alumina AES-11", product of Sumitomo Chemical Co., Ltd.) having an average particle size of 0.4 μm were added 12.35 parts of the composite acrylic polymer (B), 4.75 parts of microcrystalline wax (melting point 84° C. and 1.90 parts of stearic acid. They were sufficiently kneaded by a pressure kneader at 140° C. for 1 hour, and the mixture was cut to pellets having a size of 2 to 4 mm to give a ceramic composition for injection compacting having an alumina powder/organic binder ratio of 0.59/0.41 by volume.

The ceramic composition was compacted under an injection pressure of 500 to 1,300 kg/cm$^2$ at a compacting temperature of 120° to 160° C. to give compacts in the form of a bolt provided in JIS B-1176 having a height of 50 mm and the maximum wall thickness of 5 mm.

The thus obtained compacts were embedded in an alumina powder and heated at a rate of 30° C./hour from 20° C. to 140° C. at 4° C./hour from 140° C. to 350° C. at 10° C./hour from 350° C. to 450° C. and then at 30° C./hour from 450° C. to 600° C. to remove the binder by the decomposition. The compacts were then placed in a sintering furnace and sintered by heating to 1,620° C. and maintaining at 1,620° C. for 1 hour. The sintered compacts had no defects.

EXAMPLE 2

To 100 parts of a partially stabilized zirconia powder having a specific surface area of 6 m$^2$/g (trade mark "HSY-3.0", product of Dai-Ichi Kigenso Kagaku Kogyo Kabushiki Kaisha) were added 10.4 parts of the composite acrylic polymer (B), 4.0 parts of a paraffin wax (melting point 58° C.) and 1.6 parts of stearic acid. They were sufficiently kneaded at 140° C. for 60 minutes, and the mixture was cut into pellets having a size of 2 to 4 mm to give a ceramic composition for injection compacting having a zirconia powder/organic binder ratio of 0.51/0.49 by volume.

The ceramic composition was compacted into a bolt shape, heated to remove the binder and sintered in the same manner as in Example 1 except that after heating the compacts to 1,500° C. in a sintering furnace, the compacts were kept at that temperature for 2 hours. The sintered compacts had no defects such as warpage and cracks.

EXAMPLE 3

To 100 parts of the same zirconia powder as used in Example 2 were added 9.5 parts of the composite acrylic polymer (A), 5.0 parts of a paraffin wax (melting point 58° C.) and 1.3 parts of dibutyl phthalate. They were sufficiently kneaded at 150° C. for 60 minutes, and the mixture was cut into pellets having a size of 2 to 4 mm to give a ceramic composition for injection compacting having a zirconia powder/organic binder ratio of 0.51/0.49 by volume.

The ceramic composition was compacted into a bolt shape, heated to remove the binder and sintered in the same manner as in Example 1 except that after heating the compacts to 1.500° C. in the sintering furnace, the compacts were kept at that temperature for 2 hours to give good sintered bodies having no defects such as warpage and cracks.

EXAMPLE 4

To 100 parts of a stainless steel powder having an average particle size of 8.9 μm (SUS 304L, product of Mitsubishi Seiko Kabushiki Kaisha) were added 6.6 parts of the composite acrylic polymer (A), 1.8 parts of a paraffin wax (melting point 69° C.) and 2.6 parts of dibutyl phthalate. They were sufficiently kneaded at 150° C. for 60 minutes to give a metal composition for injection compacting having a stainless steel powder/organic binder ratio of 0.53/0.47 by volume.

The metal composition was compacted into a bolt shape in the same manner as in Example 1.

The obtained compacts were embedded in an alumina powder, and was heated in a nitrogen atmosphere at a rate of 3° C./hour from room temperature to 120° C. and then at a rate of 6° C./hour from 120° C. to 450° C. and kept at 450° C. for 2 hours to remove the binder. The compacts were then placed in a vacuum sintering furnace, heated to 1,350° C. and kept at that temperature for 1 hour to give good sintered bodies having a sintered density of 98% and having no crack.

EXAMPLES 5 AND 6

An organic binder was prepared by uniformly mixing 70 parts of the composite acrylic polymer (B), 20 parts of a paraffin wax (melting point 47° C.) and 10 parts of stearic acid.

To 100 parts of a powder of silicon nitride containing 5% of $Y_2O_2$ and 5% of $Al_2O_3$ and having a particle size of 0.1 to 0.6 μm (commercially available under the trade mark "SN-ESP", product of Ube Industries, Ltd.) was added 12 parts of the above organic binder. Also, to 100 parts of a Mn-Zn soft ferrite powder having an average particle size of 1.5 μm (product of Toda Kogyo Kabushiki Kaisha) was added 12 parts of the organic binder. The kneading, compacting and removal of binder were conducted in the same manner as in Example 1. The silicon nitride/binder ratio was 0.63,/0.37 by volume, and the ferrite/binder ratio was 0.62/0.38 by volume.

The compacts were sintered by a usual sintering technique to give sintered bodies. The obtained sintered bodies have no defects such as warpage and cracks.

EXAMPLES 7 AND 8

An organic binder was prepared by uniformly mixing 45 parts of the composite acrylic polymer (A), 40 parts of a paraffin wax (melting point 69° C.) and 15 parts of dioctyl phthalate.

To 100 parts of each of a tungsten carbide powder having an average particle size of 1.0 μm and a carbonyl iron powder having a particle size of 2 to 5 μm was added 9 parts of the above organic binder. They were kneaded in the same manner as in Example 4 to give a composition having a tungsten carbide/binder ratio of 0.50/0.50 by volume and a composition having a carbonyl iron/binder ratio of 0.58/0.42 by volume. The compositions were compacted and the binder was removed from the obtained compacts in the same manner as in Example 4.

The compacts were then sintered by a usual sintering technique to give good sintered bodies having no defects and a sintered density of 98%.

COMPARATIVE EXAMPLE 1

The procedure of Example 1 was repeated except that the mixed acrylic polymer (B) was used instead of the composite acrylic polymer (B). Failure in compacting such as breaking of sprue occurred in injection compacting and the yield was decreased by about 12% as compared with Example 1.

COMPARATIVE EXAMPLE 2

The procedure of Example 3 was repeated except that the mixed acrylic polymer (A) was used instead of the composite acrylic polymer (A). Failure in compacting such as cracking occurred in injection compacting. Cracks were also produced in the compacts during removing the binder. Thus, the yield was decreased by about 22% as compared with Example 3.

COMPARATIVE EXAMPLE 3

The injection compacting was carried out in the same manner as in Example 1 except that 14 parts of a paraffin wax (melting point 58° C.), 2 parts of EVA and 1 part of dibutyl phthalate were added to 100 parts of the alumina powder. The produced compacts were damaged when releasing from a mold because the strength of the compacts was very low, and consequently no good compacts were obtained.

COMPARATIVE EXAMPLE 4

Green compacts were prepared in the same manner as in Example 1 except that only the composite acrylic polymer (B) was added to the alumina powder in the same alumina powder/binder volume ratio (0.59/041). Satisfactory green compacts were not obtained due to lack of the flowability.

In addition to the ingredients used in the Examples, other ingredients can be used in the Examples as set forth in the specification to obtain substantially the same results.

What is claimed is:

1. An injection molding composition suitable for preparing sintered bodies which comprises an inorganic powder and an organic binder comprising 45 to 80% by weight of a composite acrylic polymer and 10 to 50% by weight of a wax having a melting point of at most 100° C. and being compatible with said composite acrylic polymer, the ratio of said inorganic powder to said organic binder being from 0.65/0.35 to 0.25/0.75 by volume, and said composite acrylic polymer being a suspension polymerization product prepared by dissolving (a) a polymer selected from the group consisting of an ethylene-vinyl acetate copolymer and an ethylene-ethyl acrylate copolymer in (b) an acrylic or methacrylic acid ester monomer or a mixture of an acrylic or methacrylic acid ester monomer and a styrene compound monomer, dispersing the resulting solution in an aqueous medium in the presence of a dispersing agent, and subjecting the resulting dispersion to a suspension polymerization.

2. The composition of claim 1, wherein said inorganic powder is a ceramic powder or a metallic powder.

3. The composition of claim 1, wherein said organic binder contains at most 40% by weight of an additive selected from the group consisting of a plasticizer, a lubricant, a surface active agent and a coupling agent.

4. The composition of claim 1, wherein the content of said wax in said organic binder is from 15 to 40% by weight.

5. The composition of claim 1, wherein the solution of the component (a) dissolved in the component (b) contains an oil-soluble polymerization initiator.

6. The composition of claim 1, wherein the solution of the component (a) dissolved in the component (b) contains a chain transfer agent.

7. The composition of claim 1, wherein the polymer component (a) and the monomer component (b) are used in an (a)/(b) ratio of 5/95 to 80/20 by weight.

8. A sintered body prepared by compacting the composition of claim 1 and sintering the resulting compact.

* * * * *